United States Patent [19]
Barth et al.

[11] Patent Number: 5,684,549
[45] Date of Patent: Nov. 4, 1997

[54] DISPLAY DEVICE WITH ELECTRO-OPTIC CELL ESPECIALLY FOR AN AUTOMOTIVE DASHBOARD

[75] Inventors: Manfred Barth, Wildbad-Calmbach; Rolf Cremers, Marxzell, both of Germany

[73] Assignee: Valeo Borg Instruments Verwaltung GmbH, Remchingen, Germany

[21] Appl. No.: 509,520

[22] Filed: Jul. 31, 1995

[30] Foreign Application Priority Data

Aug. 1, 1994 [DE] Germany ............... 44 27 173.5

[51] Int. Cl.$^6$ ............................................. G02F 1/1333
[52] U.S. Cl. .................................................... 349/58
[58] Field of Search ..................... 359/459; 349/58, 349/60, 179

[56] References Cited

U.S. PATENT DOCUMENTS

| | | | |
|---|---|---|---|
| 5,270,847 | 12/1993 | Sano | 349/60 |
| 5,274,486 | 12/1993 | Yamazaki et al. | 349/60 |
| 5,540,221 | 7/1996 | Owen et al. | 349/60 |

FOREIGN PATENT DOCUMENTS 34 08 176 A1  9/1985  Germany.
41 05 505 A1  9/1992  Germany.

*Primary Examiner*—William L. Sikes
*Assistant Examiner*—James A. Dudek
*Attorney, Agent, or Firm*—Morgan & Finnegan, L.L.P.

[57] ABSTRACT

In order to force the cell of an electro-optic display device into a defined position against a stop means rigidly mounted on the housing, for the purpose of zebra-rubber contacting with a pc motherboard rigidly installed in the housing, without obstructing the installation of the cell behind the sight opening of the housing, or without posing the hazard of damaging the sharp glass fracture edges of the glass plates of the cell, at least one leaf-type spring is clamped opposite the stop, such spring supporting itself in the direction of the stop on the edge of a glass plate of the cell, on the one hand, and in the opposite direction against an abutment, on the other hand, such abutment being rigidly mounted on the housing. The spring is punched in the form of a flap with an approximately U-shaped section from the lateral zone of a foil flatly resting against the cell, such flap bridging the free space between the cell and the abutment. Each of the flaps so defined is bulged from the plane of the foil and clamped in said free space as a bencing or compressing spring by a die which, in the course of the assembly of the display device, applies pressure to the respective flap, such die projecting laterally next to the cell, for example from a light-transmitting plate or a light box.

13 Claims, 1 Drawing Sheet

DISPLAY DEVICE WITH ELECTRO-OPTIC CELL ESPECIALLY FOR AN AUTOMOTIVE DASHBOARD

FIELD OF THE INVENTION

The invention relates to a display device, and the like.

BACKGROUND OF THE INVENTION

Such a display device is known from DE-PS 33 02 156. The problem connected with the practical realization of such and similar display devices is an exactly positioned bridging of the closely staggered, narrow contact electrodes on the edges of a glass plate of the cell, on the one hand, and a pc motherboard associated with the latter, on the other hand, by means of rubber-elastic so-called zebra contact strips, which are conductive in some areas. Even in the assembly of large series, a certain amount of play of the cell—which is inserted in the housing—relative to the motherboard—which is rigidly joined with the housing—is unavoidable for expenditure reasons. However, if the pairs of contact electrodes, the latter opposing each other, are displaced excessively, it is no longer possible to assure clear contacting by means of the conductive zebra rubber, which has to be clamped in between. The contacting conditions are particularly critical in connection with zebra contact strips that are comparatively high in the direction of conduction, because their tolerances across the height (versus absolute parallelism of the conductive areas) may lead to high absolute displacement and, consequently, contacting errors especially if the pairs of contact electrodes are not exactly aligned with each other.

DE-U-83 21 095 relates to an optical display device comprised of a housing, in which a liquid-crystal display, a contact strip and a cover are installed and maintained interlocked, using the stratified type of construction, whereby the housing has, in its bottom zone, cross bridges that are connected as one piece with attachments projecting into the space of the housing, such device being characterized in that within the frame of one side wall, provision is made for bridges extending vertically relative to the bottom zone of the housing; and that a flexible tongue is arranged on the side wall apposing the bridges.

A display device according to the introductory part of claim 1 is disclosed in DE 41 05 505 A1. Said published reference, however, neither discloses nor proposes that provision is to made in such a device for a foil, with springs cambering outwardly from the latter.

Therefore, the present invention is based on the technical problem of designing a display device of the type specified above in such a way that contacting tolerances can be reliably controlled without high engineering expenditure, or high additional expenditure for the assembly of such a device.

According to the invention, said problem is substantially solved in that the display device of the type specified above is embodied in accordance with the characterizing part of the main claim. In addition to the disclosure of the invention, reference is supplementarily made also to the afore-cited earlier publication representing the generic type of such a device, as well as to the other claims and the following explanations, including the final abstract.

According to the solution of the invention, therefore, the electro-optical cell—which is installed behind a sight opening—is forced against the motherboard by means of a spring, the latter bulging from the main plane of a foil and supporting itself opposite the stop on the housing.

Basically speaking, a leg-type spring can serve said purpose, such spring being rigidly joined with the housing and molded on a part of the latter and laterally applying pressure against the edge of the cell that is arranged opposite the reference stop, such stop being rigidly mounted on the housing. However, such a molded pressure spring would require an expensive slide-type injection molding die in light of the ejection problem, and such a spring projecting into the installation space of the cell would represent an obstacle in the assembly process because when the cell is installed in the housing from the back, such a spring would have to be bent first sideways in order to be then capable of pressing back against the installed cell. If, following insertion in the housing, the cell would be forced against the opposite stop means not by a spring, but instead by means of a comparatively rigid wedge acting next to the edge of the glass, this would lead to abrasion on the sharp edges of the glass fracture and, consequently, would cause undesirable particles to later deposit on the display, whereby even the glass itself could be endangered by the pressure admitted across a small area onto the edge of the glass fracture, which glass is highly stressed mechanically, to begin with, especially by the vibrations occurring in a motor vehicle.

Therefore, according to the invention, a spring is preferred for the positioning of a cell in the housing, the action of such a spring coming to bear only in the course of the assembly of the display device, with no adverse mechanical phenomena being caused on the glass edges of the cell on account of the supporting action of such a spring acting on the cell. All of this is assured if, when the cell is fixed behind the sight opening of the housing, a flexible spring is clamped between the housing and the cell, such a spring being strained by bending or even compression and, with its face edge, coming to rest bluntly against the adjacent face edge of the glass plate of the cell (in the latter case, consequently without any part of the spring flatly abutting any sharp edge of the glass). Such a spring will not interfere with the installation of the cell in the housing if it is pressed out from the laterally overhanging support zone of a foil—the latter resting against the cell with its other zones—and clamped between the housing and the cell only in the course of the assembly, such spring being, for example a U-shaped flap made by punching. The foil is supported against the bulging of the spring on the housing, on the one hand, and on the adjacent marginal zone of the surface of the cell, on the other hand, and extends across the entire surface of the cell preferably in the form of a frame, or even with its total surface. In the latter case, the spring can be punched directly from a scattering or color filter foil, which has to be arranged behind the cell in any case, and which, for such purpose, has to extend only slightly beyond a lateral edge of the cell in order to form the supporting zone. Practically no additional expenditure is required for the positioning of the cell in accordance with the invention. This applies to a die as well, which is needed for clamping the spring between the housing and the cell as the latter is being assembled, because such a die can be shaped by molding approximately laterally on a component of the construction, such component being required in front of or behind the cell in any case. Such a die projects from such a component which, for example, can be a light transmitting or scattering plate, or on a lamp casing, such parts being conventionally used elements for transmissively illuminating an LC-cell.

DESCRIPTION OF THE DRAWINGS

The invention is explained in the following in greater detail by preferred examples of realization, which are shown in a highly simplified representation and not entirely true to scale by the sketches in the drawing, in which.

Figure 1:
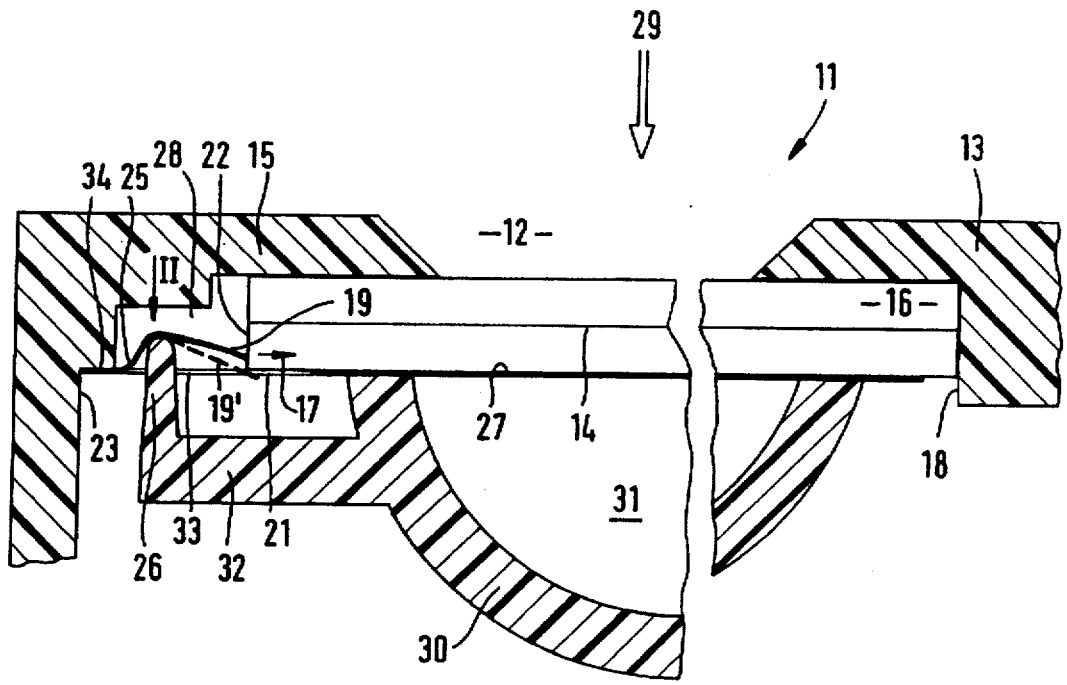
FIG. 1 shows in a broken cross sectional representation a display device according to the invention.

The sketched display device 11 with a liquid-crystal cell 14 supported in the housing 13 behind a sight opening 12 is preferably an electro-optical instrument mounted in the dashboard of a motor vehicle. The part of the housing 13 surrounding the sight opening 12 in the form of a shutter 15 projects beyond the edge zone 16 of the cell 14. According to FIGS. 1 and 2, the cell 14, along the wide edge of one of its glass plates, supports (within a zone not visible in the sectional representation of the drawing) strip electrodes serving as contacts for controlling its display electrodes, such electrodes extending parallel with each other in the usual way and transversely to the glass edge, and being disposed closely to one another. The electric connection for controlling the control circuit on a wiring motherboard with integrated circuits, such motherboard being laterally mounted behind the cell 14 in the housing 13, is established by the so-called zebra-type contact rubber strips conventionally used for such purposes. For correctly contacting the strips between the contact electrodes of cell 14 and the contact electrodes on the motherboard mechanically fixed in the housing 13, whereby the latter electrodes have a configuration matching the one of the former, and whereby the contact rubber—which is electrically conductive in parts—is clamped between the electrodes, the installation tolerances of the cell 14 have to be extremely low. This is accomplished by pressing the cell 14 with one of its marginal zones 16—the latter not being fitted with strip electrodes—against a stop 18 rigidly mounted on the housing, namely transversely to the diagonal direction, i.e., in the direction 17 parallel with the sequence of its strip-like contact electrodes. In this way, a reliable position reference is maintained for the cell electrodes with respect to the motherboard fixed on the housing 13.

Such contact pressure in the striking direction 17 is applied elastically by means of at least one leaf-like bending spring 19, which extends approximately in the direction 19 parallel with the main plane of the cell 14 and next to the latter, and which supports itself on the housing 13 opposite the cell stop 18.

Figure 2:
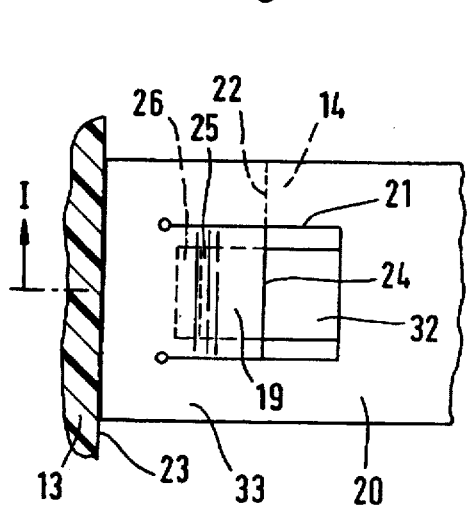
FIG. 2 shows a top view of the foil which, in FIG. 1, is arranged behind the cell.

In the case shown in FIG. 2, in which a cell 14 is fitted with contact strips along one of its longitudinal edges, which means the spring 19 is forced against a narrow side of the cell 14, the spring 19 is formed by punching in a support zone 33 of a resistantly bending foil 20, whereby the support zone projects beyond the cell 14 on the narrow side and the spring is formed by approximately a U-shaped section 21 as a simple, flap-like leg. With its other zones, the foil 20 is pressed plane parallel from the front or back against at least the marginal zone 16 of the cell 14 that is removed from the cell stop 18 and disposed adjacent to an abutment 23 rigidly mounted on the housing.

Figure 3:
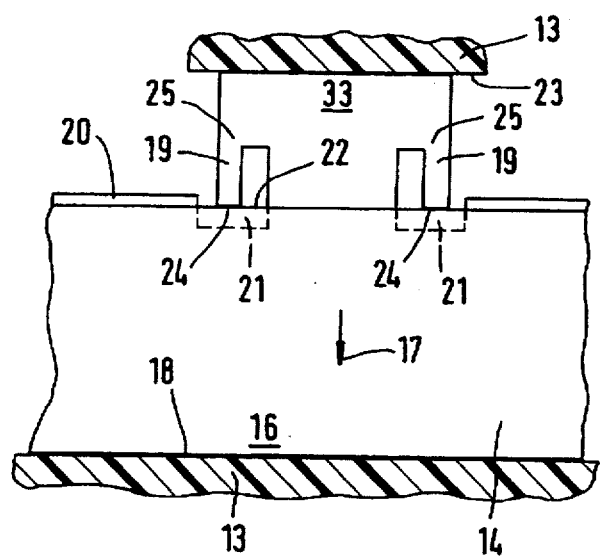
FIG. 3 shows an electro-optic cell with a modification of the conditions according to FIG. 2; i.e., the cell is supported not on the narrow but on the wide side, without showing the die used for bulging the contact springs.

On the other hand, if the contact strips (not visible in the drawing) of the cell are lined up along a narrow side of the rectangularly edged cell 14, which means that the cell 14 is consequently forced against the reference stop 18—which is rigidly mounted on the housing—transversely to its longitudinal expanse, it is more useful to prepare—in accordance with FIG. 3—at least two spaced-apart springs 19 by having such springs bulging from the support zone 33 of the foil, and clamping such springs against the edge 22 of the cell in order to assure that the cell 14 is fully pressed against its stop 18 without canting.

As the formation of the spring 19 preferably involves a bending-resistant color, scattering or protective foil that is required in connection with such an electro-optic display device 11 in any case, the foil 20 is then disposed around the cell 14 not only in the form of a frame, but extending across the entire surface of the cell 14 at least within the area behind the sight opening 12, as graphically shown in FIG. 1.

So that the flaps will curve inwardly (as shown by the dashed lines in FIG. 1) between the support edge 22 of cell 14, the latter edge being disposed opposite the stop 18, and the abutment 23 of the housing, namely in the form of the bending springs 19', or even with axial compression in the form of the pressure springs 19, the springs are forced out of the plane of the foil 20 by a flap formed by an approximately U-shaped section 21 along the bending zones 25 opposite their face ends 24, and forced into a free space 28 behind the shutter 15, such space being disposed between the cell 14 and the abutment 23. For the purpose, a die 26 engages the respective flap approximately transversely to the direction 17 of the expanse of the cell and foil, whereby such flap first continues to support itself on the support or outer surface 27 of the cell 14 against the direction of engagement, and whereby the face edge 24 of the spring is displaced along the support surface 27 of the cell in the direction of the bending zone 25 of the foil, whereas the spring 19 bulges into the free space 28 and, bending sideways, first continues to rest against the support edge 22 of the cell closely to its free face end 24. Such bulging of the spring 19 may progress until its face end 24 finally immerses in the free space 28 as well, namely next to the support edge 22 of the cell, so that the spring 19; axially clamped between the abutment 23 and the support edge 22 and, in addition to being strained by bending, is now stressed also by compression Therefore, in the course of the cell assembly, as the cell 14 is being installed from the back, the die 26 presses into the free space 28 parallel with the direction of assembly either in or against the viewing direction 29 depending on whether the foil is positioned in front of or behind the cell 14, and thus against the foil support zone 33 next to the cell 14, in order to bulge and clamp the spring 19', 19. If the foil 20 is disposed in front of the cell 14 when viewed in the viewing direction 29, the die 26 is usefully arranged for the purpose directly behind the shutter 15 in the free space 28 next to the cell 14, or preferably directly molded onto the cell by injection molding. With the position of the foil 20 as sketched in FIG. 1, where it is disposed behind the cell 14, the projecting die 26 can be fitted with a construction element resting against the back of the cell 14. Starting from such an element, the foil support zone 33 laterally projecting beyond the cell 14 is forced by the die 26 against a supporting jaw 34, which is rigidly mounted on the housing. The construction part in the back is, for example a light transmitting or scattering plate, but preferably the side wall 30 of the lamp housing 31, the latter adjoining the cell 14 in the back for transmissive or transflective illumination. An arm 32 then projects from the side wall 30 of the housing up to behind the free space 28 in order to support there the die 26 for clamping the spring 19 in the course of the assembly of the lamp housing 31. In any case, the spring 19 is first bulged from the plane of the foil 20 directly in the course of the assembly of the display device 11, and clamped in the free space 28 in order to force the cell 14 against the stop 18, which is rigidly mounted on the housing. Therefore, the spring 19 is not a construction element projecting into the installation space of the cell transversely to the assembly and viewing direction and, thereby interfering with the assembly.

We claim:

1. Display device with an electro-optic cell in a housing especially for an automotive dashboard, comprising a cell with an edge zone, is forced by at least one leaf-type spring having a lengthwise direction against a stop rigidly mounted on the housing, for which purpose the spring is bulged from the main plane of a foil and supported on the stop opposite the housing.

2. Display device with an electro-optic cell in a housing especially for an automotive dashboard, comprising a cell with an edge zone, is forced by at least one leaf-type spring having a lengthwise direction against a stop rigidly mounted on the housing, for which purpose the spring is bulged from the main plane of a foil and supported on the stop opposite the housing, a free face end on the spring, oriented in the lengthwise direction thereof approximately parallel with the main plane of the cell, and clamped selectively for flexure and compression between a support edge of the cell and an abutment of the housing.

3. Display device according to claim 2, further comprising each spring punched in the form of a flap from the foil resting on the cell in a support zone laterally projecting beyond the cell.

4. Display device according to claim 3, further comprising a viewing direction, a die supported on a construction element, such element being arranged behind the cell in the viewing direction.

5. Display device according to claim 2, further comprising a viewing direction, a die supported on a construction element, such element being arranged behind the cell in the viewing direction.

6. Display device with an electro-optic cell in a housing especially for an automotive dashboard, comprising a cell with an edge zone, is forced by at least one leaf-type spring having a lengthwise direction against a stop rigidly mounted on the housing, for which purpose the spring is bulged from the main plane of a foil and supported on the stop opposite the housing, wherein each spring is punched in the form of a flap from the foil resting on the cell in a support zone laterally projecting beyond the cell.

7. Display device according to claim 6, further comprising a viewing direction, a die supported on a construction element, such element being arranged behind the cell in the viewing direction.

8. Display device with an electro-optic cell in a housing especially for an automotive dashboard, comprising a cell having a support edge, an abutment in the display device, the cell being forced by at least one leaf-type spring against a stop rigidly mounted on the housing, the leaf-type spring being formed in a foil and having a flap for which purpose the spring is bulged from the main plane of a foil and supported on the stop opposite the housing, a viewing direction, a support zone approximately in or against the viewing direction, a die resting against the support zone for forcing the flap from the main plane of the foil and into a free space between the cell and the abutment until the leaf spring is bent in compression and rests laterally against the cell and selectively even until the compression-bent spring has positioned itself spread face to face between the abutment and the support edge.

9. Display device according to claim 8, further comprising a die supported on a construction element such element being arranged behind the cell in the viewing direction.

10. Display device with an electro-optic cell having a viewing direction in a housing especially for an automotive dashboard, comprising a cell forced by at least one leaf-type spring having a lengthwise direction against a stop rigidly mounted on the housing, for which purpose the spring is bulged from the main plane of a foil and supported on the stop opposite the housing, a die supported on a construction element, such element being arranged in front of the cell in the viewing direction.

11. Display device with an electro-optic cell having a viewing direction in a housing especially for an automotive dashboard, comprising a cell forced by at least one leaf-type spring having a lengthwise direction against a stop rigidly mounted on the housing, for which purpose the spring is bulged from the main plane of a foil and supported on the stop opposite the housing, a die supported on a construction element, such element being arranged behind the cell in the viewing direction.

12. Display device with an electro-optic cell in a housing especially for an automotive dashboard, comprising a cell, a foil having a support zone, at least one leaf-type spring formed in the foil support zone, the leaf-spring having a lengthwise direction for forcing the cell against a stop rigidly mounted on the housing, for which purpose the spring is bulged from the main plane of the foil and supported on the stop opposite the housing, a supporting jaw is formed on the housing for supporting the support zone of the foil.

13. Display device with an electro-optic cell in a housing especially for an automotive dashboard, comprising a cell with an edge zone, is forced by at least one leaf-type spring having a lengthwise direction against a stop rigidly mounted on the housing, for which purpose the spring is bulged from the main plane of a foil and supported on the stop opposite the housing, several of the leaf-type springs selectively bulged from the foil, said leaf-type springs being displaced against each other.

* * * * *